RETINA OF DEVICE

RETINAS OF DEVICE FOR DIFFERENT CELL ORIENTATIONS

United States Patent Office 3,522,585
Patented Aug. 4, 1970

3,522,585

PATTERN RECOGNITION DEVICES

Christopher Archibald Gordon Lemay, Isleworth, England, assignor to Electric & Musical Industries Limited, Hayes, Middlesex, England, a company of Great Britain

Filed Jan. 27, 1966, Ser. No. 523,394
Claims priority, application Great Britain, Jan. 30, 1965, 4,199/65
Int. Cl. G06k *7/00, 9/00;* G08b *23/00*
U.S. Cl. 340—146.3 8 Claims

ABSTRACT OF THE DISCLOSURE

There is provided a pattern recognition device comprising sensing means for producing an input signal related to a pattern to be recognised and storage means for data signals related to previously classified patterns. Associated with data signals from previously classified patterns are identity signals and, in some cases at least, displacement signals. Means are provided for comparing the input signal with the data signals to select a data signal according to a particular selection criterion and, if there is an associated displacement signal, to effect a corresponding displacement, or the effect of displacement, of the pattern to be recognised relative to the sensing means, so as to cause a further input signal to be applied to the comparison means for a further comparison with the data signals; and so on until a data signal is selected which best fits the selection criterion, which data signal produces an output signal in response to its associated identity signal. Preferably the storage means comprises a plurality of storage means, corresponding respectively to each of a plurality of portions of the previously classified patterns, and the comparison means effects comparisons between the corresponding portions of previously classified patterns and portions of the patterns to be recognised.

The present invention relates to pattern recognition devices and especially to such devices as are arranged to be capable of being taught to associate predetermined outputs with known patterns applied to the device.

It is an object of the present invention to provide an improved pattern recognition device which is capable of distinguishing between closely similar patterns.

According to the present invention there is provided a pattern recognition device comprising sensing means for producing an input signal related to a pattern to be recognised, storage means for data signals related to previously classified patterns, associated identity signals and displacement signals associated with some at least of said data signals, means for comparing said input signal with said data signals to select a data signal therefrom according to a particular selection criterion, means effective when said storage means includes a displacement signal associated with said selected data signal for producing a corresponding displacement, or the effect of a corresponding displacement, of said pattern to be recognised relative to said sensing means so as to cause an input signal related to the displaced pattern to be applied to said sensing means for a further comparison with said data signals, and means for producing an output signal in response to the identity signal associated with the selected data signal which most nearly fulfils said criterion.

Figure 3A:
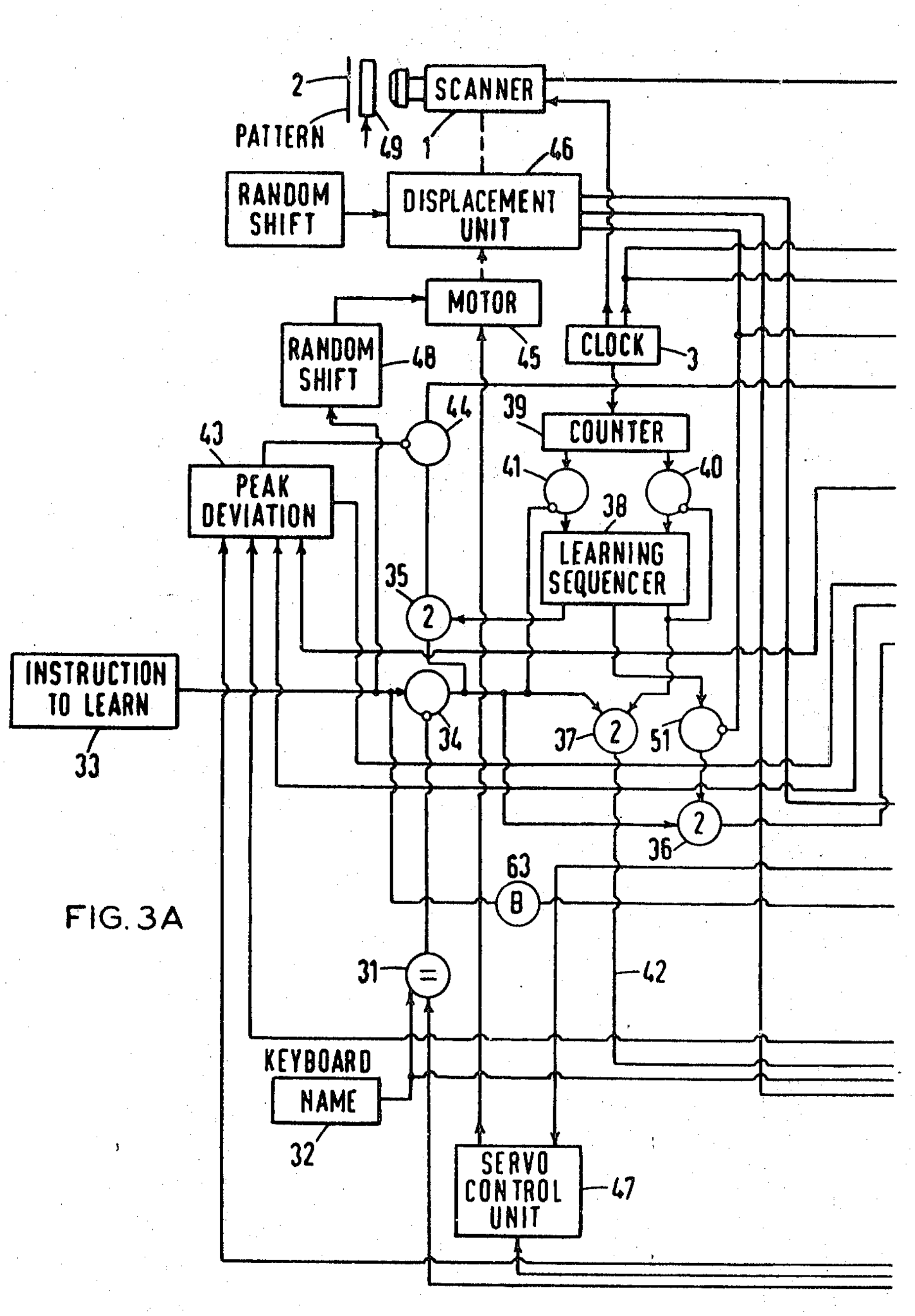
Figure 1:
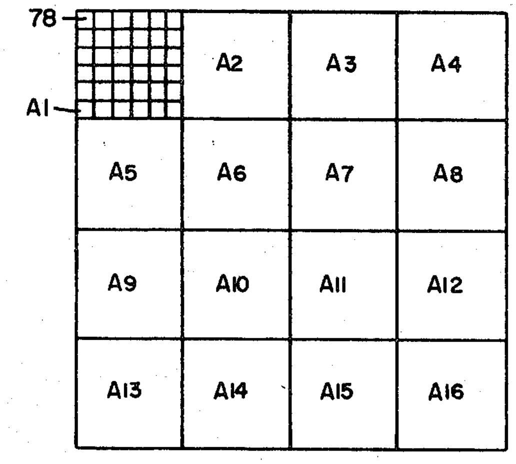
Figure 2A:
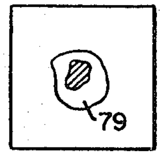
Figure 2B:
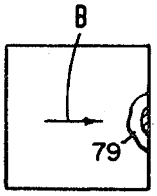
Figure 2C:
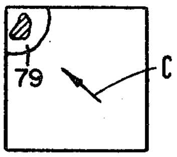
Figure 2D:
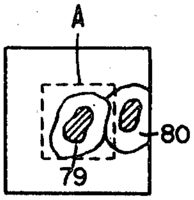
Figure 2E:
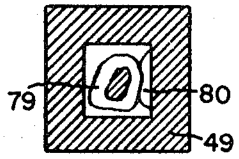
Figure 3B:
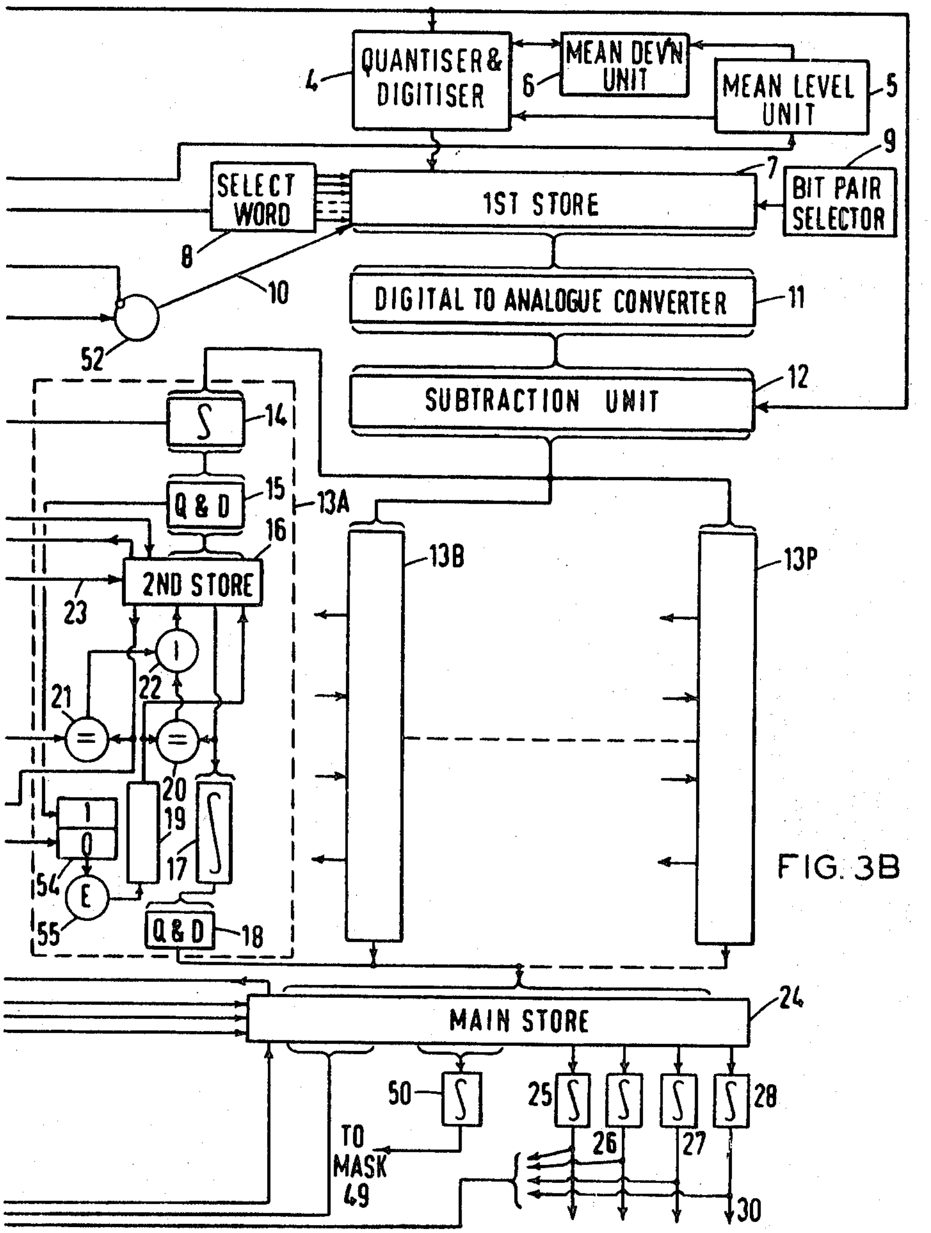
Figure 4:
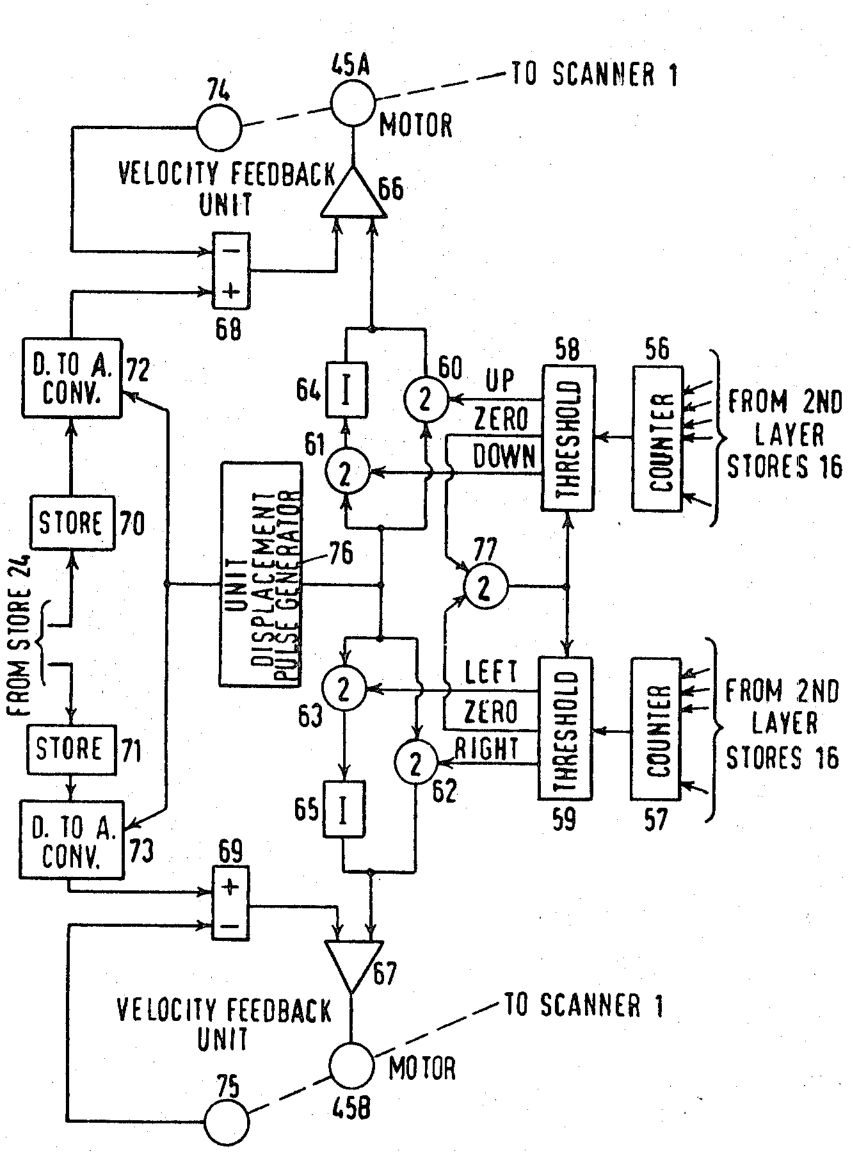

In order that the invention may be clearly understood and readily carried into effect it will now be described with reference to the accompanying drawings of which:

FIG. 1 is a diagram to be used in explaining the operation of one example of a device according to the invention, FIGS. 2*a*, 2*b*, 2*c*, 2*d* and 2*e* are further diagrams to be used in explaining the operation of the device, FIGS. 3*a* and 3*b* are diagrams of one embodiment of a device according to the invention, and FIG. 4 is a diagram showing in greater detail part of the embodiment shown in FIG. 3.

The example of the invention shown in FIG. 3 is a device for distinguishing between various classes of blood cells, but it is, of course, applicable to any form of pattern recognition. Such cells display considerable variation within the different classes and whilst a cell may readily be classified by a cytologist, the variations within each class render the automatic classification of the cells extremely difficult. Moreover, the device shown in FIG. 3 is an adaptive machine, that is to say, it is arranged so that on being shown cells in the various classes and being taught the correct classifications of these cells it is subsequently able to identify not only the cells which it has been taught but also is able to classify other cells having the same characteristics.

Another feature of the device shown in FIG. 3 is the servo-controlled movement of the scanner over the cells to be classified so that the necessity for positioning of the cells in the field of view of the scanner is avoided. The scanner which carries the reference 1 in FIG. 3 is arranged to respond to a restricted area of the field of view divided into 576 elements consisting of 24 lines each of 24 elements. This restricted area of the field of view is referred to hereinafter as the retina of the device and is sub-divided into 16 areas, each having a square of 36 elements as shown in FIG. 1 which shows 16 areas A1–A16 of which just A1 is shown for illustration subdivided into 36 elements such as 78.

A further feature of the device is the servo controlled movement of the scanner which is shown as being done with mechanical motors in FIG. 3. In fact the scanner could consist of a matrix of store locations from which the picture points are read in sequence, and a translation of the image could be achieved by renumbering the store locations in relation to the rest of the machine, so that each point in the matrix is transferred to a new part of the learning machine.

Before embarking on a full description of FIG. 3 an outline of the operation of the device when classifying cells will be given in order that the more detailed description may more readily be understood, and in this outline the effect of the displacement information is neglected. The output of the scanner 1 is a video waveform corresponding to a raster of twenty-four lines with twenty-four elements per line and this video waveform has subtracted from it, element by element as it is received, signals corresponding to 32 stored images which are previously entered in the first store 7. Thus the first store includes 576 words, one for each element of the retina, each word having 64 bits so that there will be two bits in each word corresponding to each of the 32 stored images. The words in the first store are selected in synchronism with the scanning of the retaina by the scanner. The results of the subtractions are applied to 512 integrators arranged in 16 groups, each of 32 integrators. The switching of the signals to these integrators is such that each integrator receives the output signals from the subtractions corresponding to the elements of a respective area of the retina, there being 16 such areas as stated above, to each of which corresponds a group of integrators, the 32 integrators in each group corresponding to respective ones of the 32 images stored in the first store. Thus each integrator stores a quantity which is a measure of the similarity of the respective area of the image viewed by the scanner to the corresponding area of the respective one of the stored images. The output of each integrator is quantised to four levels and digitised to form a two bit word so that from each group of 32 integrators a 64 bit word is obtained which is compared with the words stored in a second store common to a group of integrators. The second store includes means for selecting that one of the stored words which is most similar to the 64 bit word derived from the integrators. The words in each second store are divided into eight sets each identified by a respective feature number and eight integrators are provided for each second store, each integrator corresponding to a respective feature number, and accumulating the degrees of fit of words in the second store having the particular feature number, the words being successively selected as most similar to the signal applied to the second store as the input image is moved over the retina in response to displacement information as described below. Each word in the second store has 64 bits for the pattern, eight bits to denote the set to which the word belongs, one for each set and two bits for displacement information. The outputs of the integrators are quantised to four levels and digitised to form two bit words so that the total output from each second store is a sixteen bit word, two bits from each of eight integrators. The sixteen words from all sixteen of the channels including the second stores are applied as an input pattern to the main store. The main store contains about 1000 words each of 269 bits, these words being divided into a 256 bit section which is compared with the 256 bits which are received from the second stores, a four bit section for the name of the cell, a three bit section corresponding to the size of mask to be used by the scanner details of which will be given subsequently and a six bit section for the displacement required of the scanner, three bits being allocated to horizontal and three bits to vertical displacement. The combination of 256 bits applied to the main store from the second stores is compared with the 256 bit sections of all the words in the main store and that word of the main store which has the greatest similarity to the 256 bit combination from the second store is selected, the four bit section of it being applied to four integrators one for each bit. These four integrators operate in the manner described in co-pending U.S. patent application No. 247,156, now Pat. No. 3,252,140 to provide an output signal representing the identity of the image viewed by the scanner.

As the scanner 1 is moved under the control of the displacement information from the second stores and the main store, so the signal inputs to the seconds stores will change, thus causing a pattern of totals to be accumulated in the integrators fed by the outputs of the second stores. The totals of these integrators are continuously quantised and digitised relative to the mean levels and means deviations of the totals, so as to provide the input signal to the main store. In a similar way the main store continuously selects the stored pattern most like the pattern applied to it and applies to the signals representing the names associated with the selected patterns to the four integrators 25 to 28 until they reach their extreme states and produce the output code at 30 in FIG. 3.

The scanner 1, which consists of a television pick-up tube and its associated scanning circuits receives an image of the pattern on the surface 2 which may, for example, be a microscope slide. A clock 3 producing clock pulses at the rate of $3\times10^6$ per second is connected to the scanner 1 to drive the scanner circuits in such a way that every 24 clock pulses a line scanning pulse is produced and every 576 pulses a frame scanning pulse is produced; thus it will be appreciated that each clock pulse from the clock 3 corresponds to an element of the retaina of the scanner 1. The video signal from the scanner 1 is applied to a quantiser and digitiser 4 which is coupled to a mean level unit 5 and mean deviation unit 6. The quantiser and digitiser 4 quantises the incoming video signal into four levels and produces an output in binary code in the form of a two bit word. The mean level unit 5 and the mean deviation unit 6 control the quantising levels of the unit 4 so that substantially equal numbers of elements fall into each quantised interval. In the quantising and digitising units 15 and 18 used later in the system a mean level unit such as 5 and a mean deviation unit such as 6 are also provided to organise the quantising levels but are not shown separately from the units 15 and 18. The integrators may be reset to zero at appropriate intervals or may include a steady decay proportional to the stored value.

The digitised video signal is applied as an input to the first store 7 which contains storage for 576 words each of 64 bits. A word selector 8 is driven by the clock 3 to select the words of the first store 7 in synchronism with the scanning of the image by the scanner 1 with the result that each two bit word from the quantiser and digitiser 4 is entered into the store 7 at the storage location corresponding to the element of the image represented by the two bit word at a position in the word determined by the selector 9. Entry into the first store 7 can take place only during the presence of a write signal on the conductor 10. The words from the first store 7 are read in parallel by the selector 8 and applied to the digital to analogue converter 11 which converts each bit pair in the words to a corresponding analogue signal so that the output from the converter 11 consists of 32 quantised video signals in synchronism with the video signals from the scanner 1. In the subtraction unit 12 the quantised video signals from the converter 11 are subtracted from those from the scanner 1. The thirty-two different signal outputs of the subtraction unit 12 are applied to sixteen data channels 13A, 13B . . . 13P.

It must be understood that a single image of an object seen by the scanner is held by a pair of bits in each of the 576 words in the first store. These are fed in whilst the object is being scanned. The other images in the store are fed in on subsequent occasions from other objects viewed by the scanner, the position of the pairs in the words being chosen by the bit pair selector 9.

Each channel 13 includes amongst other components thirty-two integrators 14, thirty-two quantising and digitising units 15, a second store 16, eight integrators 17, eight quantising and digitising units 18, and a feature number counter 19. It will, moreover, be appreciated that for clarity in the drawing the circuit details of any connections to channel 13A only are shown although the other channels 13 are similarly arranged. Each data channel 13 corresponds to a respective one of the sixteen 36 element areas of the retina and each integrator 14 in a channel 13 receives the outputs from the subtraction unit 12 corresponding to a respective one of the thirty-two stored images fromthe first store 7. Switching units are provided, but are not shown in the drawing, to apply to the integrators 14 the appropriate difference signals from the subtraction unit 12. The output of each integrator 14 is extracted every two frames of the scanner 1, quantised to four levels and digitised to form a two bit word by a respective unit 15. The digit outputs of the 32 units 15 in each channel 13 are combined to form a 64 bit word for the channel which is compared with the words stored in the second store 16 of the channel. Each word in the second store 16, which, contains about a 1000 such words, consists of 74 bits of which 64 bits are used for comparison with the incoming 64 bits from the quantiser and digitiser units 15, eight bits which indicate the feature number and select to which of the eight integrators 17 the word is allocated and two bits allocated to displacement, one bit for the horizontal displacement and one bit for the vertical displacement. Information can only be written into the second stores 16 on the application of a signal to the conductor 23.

The objects of these units 13 now being described is to provide a name or a number corresponding to some feature in the observed pattern, such as an edge or a spot. Each of the units 13 corresponds to a particular area of the retina and the main store 24 is able to relate these features to each other so as to identify the object to which they belong. The name given to the feature is in fact an arbitrary number provided by a counter 19. The same number is maintained on the feature number counter 19 during the inspection of a single cell that is being learnt. During this period the scanner causes the image to move about on the retina which in turn causes a series of patterns to be presented to the units 13. These must all be learnt and given the numbers on their respective feature number counters. The method of achieving this is to store in the first word of the second store the incoming pattern of 64 bits together with the output responses including the number on the feature number counter. So long as this incoming data remains substantially the same the feature number issued will remain the same, as the store is rapidly interrogated, thus the equality gate 20 will indicate equality and inhibit the storage of further data. However, if there are a number of patterns in the second store 16 which have been put in in this sort of way and the image of the object being inspected is moved on the retina the feature that was last registered by the second store will move and it is probable that it will cease to be recognised to be the same feature. Each incoming pattern is compared with all of the patterns in the store 16, the number of bits in each stored pattern which agree with the incoming pattern from the unit 15 being noted and that one of the stored patterns having the best fit is selected by means not shown in the drawing. A signal of magnitude dependent on the degree of fit is passed to the integrator 17 associated with the feature number of the selected pattern. Thus at any moment after the scanner has been inspecting the object for a number of frames there will be a pattern of resemblances in the integrators 17. This pattern will carry the identity of the feature being inspected. The equality gate 20 is fed with only an indication of the feature number belonging to that pattern in the stores 16 which best fitted the unknown, whereas the integrators 17 are fed with signals dependent on the degree of fit provided by the pattern having the best fit at different times with the unknown. When the object is moved on the retina the pattern in the second store which fits best will alter and this will result in a different feature number being issued to the equality gate 20. This will cause it to register unequality and cause the second store 16 to store a new word in which will be written the new signals from the unit 15 together with the same number as before from the feature number counter. In this way the second store will finally give the same feature number irrespective of the exact position of the feature on the retina. The larger the excursion which the scanner completes the more patterns will be needed in the second store in order to continue to identify the input pattern to the second store correctly.

As stated above the stored feature number is compared with the number from the feature number counter 19 in the equality gate 20, and also the stored displacement data is compared with the displacement data from the unit 46 in the equality gate 21. The outputs of gates 20 and 21 are combined in the OR gate 22, the output of which inhibits the learning process of the store 16. The updating of the feature number and displacement data in the second stores 16 can only take place when there is no output from the gate 22. When a 64 bit word from the units 15 is compared with the words from a second store 16, each pair of bits of the stored word is considered separately as a 4 level value and the square of the difference or some other suitable measure is added in to the total measure of the difference between this word and a word from the units 15; this may be achieved as with first store 7 by converter 11 and unit 12. The total count, or a suitable function of it chosen on the basis of statistical theory, is applied to that one of the integrators 17 which is indicated by the part of the stored word which serves to select the integrator. In the eight bits of each stored word which are allocated for the selection of integrators of "1" is entered in to the position corresponding to the integrator into which the total count produced by the comparison is to be entered. For simplicity the circuitry necessary to effect the distribution among the integrators has been omitted from the drawing. The displacement information for the word or words from the stores 16 providing the best fit to the incoming pattern is passed to the servo control unit 47 and used to control the motor 45 to effect displacement of the scanner 1 in a manner to be described subsequently.

The number in the feature number counter 19 is increased by one by each output pulse from the end of pulse gate 55. The gate 55 produces a pulse when the bistable unit 54 changes from the "0" to the "1" state. The unit 54 is set into the "0" state by the beginning of the instruction to learn signal from 33 via beginning of pulse gate 53, and is set to the "1" state by the quantising and digitising unit 15 when a sufficiently large change in the mean level has occurred. Thus the feature number is only changed after an instruction to learn has been issued, i.e., after the scanner 1 is presented with a new cell to learn, and after the outputs from the integrators 14 have changed to an appreciable extent, for example, because the shape of the cell in the particular area is totally different.

The totals in the integrators 17 are continuously quantised into four levels and digitised to two bit binary words by the units 18, so that eight bit pairs are produced at the output of each channel 13. The 256 bit word formed by the combined outputs of the channels 13A, 13B . . . 13P is applied to the main store 24 where it is compared with the stored words in turn until the best fit is obtained. The four bits forming the name portion of the word or words providing the best fit are applied to respective output integrators 25, 26, 27 and 28. The output integrators 25, 26, 27 and 28 are such that they start from a zero condition initially and move upwards in response to a "1" input and downwards in response to a "0" input, the total range of travel from the zero condition to the positive and negative limits being the same, for example, eight units. Devices are provided to sense when an output integrator reaches either the positive or negative limit when the appropriate output digit "1" or "0" is transferred to the output leads 30. A signal on the output leads 30 is only accepted by subsequent apparatus, such as a typewriter if an output digit is present on all four output integrators, no output being produced unless this criterion is satisfied. This arrangement is described in greater detail in co-pending U.S. patent application No. 247,156, now Pat. No. 3,252,140. The mask information from the word from the store 24 providing the best fit is applied to the integrator 50, and the displacement from the same word is applied to the servo control unit 47.

The digits produced on the output leads 30 are applied to a comparison unit 31 which compares the output signal with the name set up manually on a key board 32 so that during the learning phase of the machine the production of an output signal which differs from the name set up manually on the key board 32 will cause the device to continue the learning procedure. The instruction to learn is produced by the unit 33 in response to the operation of a switch on the device, which signal is produced continuously during the learning phase. The output of the unit 33 is applied via a gate 34, which is inhibited by an output from the unit 31, to the inputs of three "two" gates 35, 36 and 37. The other inputs of the two gates 35, 36 and 37 are provided by the outputs of a learning sequence counter 38 which produces outputs successively on three output leads in response to successive pulses received from a counter 39 via a gate 40. The counter 39 also provides a reset signal for the learning sequence counter 38 via a gate 41. The clock 3 applies one pulse in every frame to the counter 39 which in turn applies one pulse every 32 frames via the gate 40 to the learning sequence counter 38. The counter 38 has three outputs which appear sequentially on the left, central and right output conductors shown in the drawing. The counter 38 is reset to an initial condition when the left-hand conductor receives the output, by means of the signal from the counter 39 transmitted through the gate 41 which is disabled during the learning phase. When the output of the counter 38 reaches the third or right-hand conductor a signal is applied to inhibit the passage of signals through the gate 40. The output of the gate 35 is applied via a gate 44 to the conductor 10 to control the insertion of data into the first store 7. The output of the gate 36 is applied to the conductor 23 to control the insertion of data into the second store 16 and the output of the gate 37 is applied to the conductor 42 to control the insertion of data into the main store 24.

A signal representing the peak deviation of the output signals from the integrators 14 is selected by the unit 43 which thereby provides an inverse measure of the greatest degree of similarity between the video signal from the scanner 1 and any one of the images stored in the first store 7. The output from the unit 43 inhibits the gate 44 if one of the images stored in the first store 7 is sufficiently like the incoming video signal from scanner 1.

In roughly the same way the degree of similarity of the patterns from unit 15 being compared with those in the second store 16 must be measured, but in this case it is simpler since the scoring routine itself provides this measure which is passed to the peak deviation unit. This is used to control learning in the second store on those occasions when it has already found a good fit. The same process is applied to the main store 24. Thus the insertion of very similar patterns in the stores 7, 16 and 24 is avoided.

The position of the scanner 1 is determined by a motor arrangement 45 and its position in two orthogonal directions with reference to a central position is registered by the displacement unit 46 which produces two sets of output signals, one of which is applied to the comparison units 21 to update the stores 16 in the channels 13 and the other of which is applied to the main store 24; these signals are only used during learning and play no part in the recognition mode of the machine. In practice, separate motors 45 and units 46 would be provided for each direction of movement of the scanner 1, but for simplicity in the drawing only a single motor 45 and a single unit 46 are shown. The operation of the motor 45 is determined by the servo-control unit 47 in response to displacement information derived from the second stores 16 and the main store 24. Random shifts of approximately six elements of the scanner 1 are also produced at intervals of about 10 frames during the learning phase in response to the instruction to learn by means of the unit 48.

Due to the long time delay before information from the scanner reaches the main store 24 it is not satisfactory to use the output from this unit to provide servo instructions to the scanner since this would result in an unstable servo system. Instead the system has been designed so that the servo instructions come mainly from the units 13 and the time delay in the integrators 14 and the rest of the chain has been kept as low as possible in order to limit the oscillation of the scanner.

The motor 45 shown may, in fact, consist of a renumbering process in the allocation of data from the scanner to the first store, so that there is no inertia in this servo system and the overshoot associated with each oscillation can be easily calculated from the time delay in the integrators 14. If this is made to be about $\pm 3$ picture points it is considered that this will provide a satisfactory range over which each feature must learn to give the same output response from the units 13.

It is possible that on some occasions the signals from the units 13 will not allow satisfactory homing of the scanner 1 to its central position, and for this reason the servo control unit 47 occasionally inserts a displacement instruction derived from the main store. If the homing process had already been satisfactorily completed and the main store had recognised that a centralised image was being inspected, then this signal would be very small and have negligible effect on the whole performance. However if this were not the case the larger capacity of the main store would enable the machine to discern in which direction it is necessary to displace the image in order to improve the chances of the units 13 providing the correct servo responses. An occasional failure would not be disastrous as any change in the routine would give the units 13 another chance to centralise the scanner 1 on a cell.

Gates 51 and 52 are provided to inhibit the entry of data into the first store 7 and the second stores 16 in response to an output from the displacement unit 46, if the departure of the scanner 1 from the central position exceeds a predetermined amount.

FIG. 4 shows in greater detail the servo controlled unit 47 showing how the displacement informtaion derives from the second stores 16 and the main store 24 is used to cause the motor 45 to displace the scanner 1 in the desired directions. As explained above the motor 45 in fact consists of two motors one for each direction of movement of the scanner 1. In FIG. 4 the motor 45A produces up and down motions of the scanner 1 and the motor 45B produces left to right motions of the scanner 1.

The displacement information in each of the second layer stores 16 consists of two bits of information one bit being allocated to left and right information and the other bit to up and down information and is such that if the digit varying up and down information is a 1 then an upward movement is required and if it is a zero downward movement is required. Similarly if the left right digit is a one then a leftward movement is required and if it is a zero a movement to the right is required.

All of the up-down digits of words selected from the second stores 16 are applied to a counter 56 which produces an output signal indicating the total number of 1's included in these digits. The output of the counter 56 is applied to a threshold circuit 58 which has three outputs on a respective one of which a signal appears if the output of the counter 56 is above a first threshold level, between the first threshold level and a second threshold level or below the second threshold level. Thus a signal on the uppermost output of the threshold circuit 58 indicates that an upward movement is required, a signal on the central output indicates that no movement is required and a signal on the lowest output indicates that a downward movement is required. The highest and lowest of the output conductors of the circuit 58 are connected to enable respective gates 60 and 61. The output of gates 61 is connected via an inverter 64 to the output of gate 60. The inputs of gates 60 and 61 are both connected to a pulse generator 76 which produces a pulse of such amplitude and duration as to cause the motor 45A to move a distance of one element.

The common output of gate 60 and inverter 64 is connected to amplifier 66 to drive the motor 45A. It should now be clear that the up and down motion of the scanner 1 in response to the up and down digits derived from the second layer stores 16 is limited at any time to a single element in the up and down direction, although of course if the number of stores 16 demanding an upward movement is approximately equal to those demanding a downward movement then no upward or downward movement of the scanner 1 takes place subject to a proviso to be explained later. Since there are 16 channels 13, there are 16 second layer stores 16 and therefore 16 inputs to the counter 56. The threshold circuit 58 may be set so that a signal appears on the highest output if the total from the counter is 10 or more, the output appears on the lowest conductor if the output from the counter 56 is 6 or less and the output appears on the central conductor if the output of the counter 56 is 7, 8 or 9.

The counter 57, threshold circuit 59, gates 62 and 63, inverter 65 and amplifier 67 provide similar controls for the motor 45B in response to the left to right digits of the second layer stores 16. To ensure that the motors 45A and 45B execute the required movement they are provided with velocity feedback units 74 and 75 connected to the respective amplifiers 66 and 67.

Since if the scanner 1 does not execute any displacements in response to a particular pattern, it is possible that the recognition device will be unable to recognise the pattern and yet incapable of performing any movement to derive more information from the pattern there is provided the gate 77 which in the presence of a zero output from both threshold circuits 58 and 59 changes the thresholds of these threshold circuits until one or other ceases to produce a zero output. If the thresholds are initially set as explained above that is so that a zero output is produced if the output of the counter is 7, 8 or 9 initially the threshold may be changed so that a zero output is produced only if the output of the counter is 8 and if a zero output is still produced then a total of 8 is arbitrary allocated to the up or left dimensions respectively.

The displacement outputs from the main store 24 which consist of three digits for up and down information and three digits for left to right information, so that a maximum movement of + or −4 elements in each direction are possible, is entered into respective stores 70 and 71. Considering the up and down information the output of the store 70 is converted to analogue form by unit 72 and a pulse of known length from the generator 76 is applied to the unit 72 so that from this unit there is produced a pulse of this length having its amplitude equal to the value represented by the required up and down displacement represented by the signals from the store 24. The output signal from the unit 72 is applied to the amplifier 66 thus causing the motor 45A to execute the desired movement under control of the velocity feedback unit 74. The left to right movements required by the store 24 are performed in a similar way by the motor 45B in response to the output of the unit 73.

The pulse generator 76 emits pulses to the gates 60, 61, 62 and 63 once for every two frames of the scanner 1, but it emits pulses to the digital to analogue converters 72 and 73 only once every 60 frames so that the larger displacements which take place in response to the main store 24 are much less frequent than the unit displacements which occur in response to the second layer store 16.

A mask 49 is provided to limit the retina of the scanner 1 to a restricted square area having a side determined in response to a signal derived in the main store 24 so as to remove extraneous material from the image presented to the scanner 1 thereby to eliminate interference in the final stages of the classification phase of the device.

It will be appreciated that the device shown in FIG. 3 has two phases of operation, a learning phase and a classification phase. During the learning phase the device is presented with a cell of previously classified type, the name of the cell and the size of the mask through which it is viewed are set up manually on the key board 32 and the instruction to learn switch is pressed. Only during the learning phase can data be entered into any of the stores 7, 16 and 24. The learning phase initially follows the same operations as the classification phase and produces an output signal at 30 which output signal is compared with the name set up on the key board 32 in the comparison unit 31. If unit 31 produces an output indicating that the signal at 30 and name set up on the key board 32 are the same then it is clear that the device has already learned the cell which it is being taught and has classified it correctly. A signal from the unit 31 indicating that the device has classified the cell correctly inhibits the instruction to learn by means of the gate 34 thus terminating the learning process. However in general the output at 30 will differ from the name set up on the key board 32 and the learning process will continue as described below.

In the classification phase the device searches for a cell and produces a name for the cell when it finds one; the device may also be arranged to execute a random shift in response to signals from the unit on the left of the displacement unit 46 after identifying a cell and then search for another cell, so that the cell in a region may be classified.

During learning the device is presented by the operator with a single cell of previously classified type at the centre of the field of view and will see an image such as is shown diagrammatically in FIG. 2*a* of FIG. 2, which shows a series of retinas for different cell orientations. In FIG. 2*a* a cell 79 is centrally placed and is not confused by the presence of other cells close to it. If another cell 80 had been close to the cell in FIG. 2*a*, that is an arrangement like that shown in FIG. 2*d* is seen by the scanner 1 then the operator adjusts the mask 49 by depressing keys on the key board 32 to reduce the field of view of the scanner 31 to that indicated by the dotted line A with the result that the image shown by the scanner 1 resembles that shown in FIG. 2*e*. In fact the mask 49 would always be used to surround the cell as closely as possible without overlapping it during the learning phase so that at the final stage of classification the same mask can come into use so as to eliminate the effects of other cells in the vicinity of the cell under examination.

In the learning phase when a cell is viewed by the scanner 1, after disagreement between the output at 30 and the name set up on the key board 32 has been registered by the unit 31, the video signals from the scanner 1, quantised and digitised by the unit 4, are applied to occupy a selected bit pair position of each word in the first store 7 under the control of a signal on conductor 10. During a later frame the video signal from the scanner 1 is compared with the signal thus stored and the subtraction unit 12 will produce an output which indicates that one bit pair in each word stored in the store 7 is substantially identical with the incoming video signal from the scanner 1. If an image substantially identical with the image viewed by the scanner 1 had previously been stored in the store 7, this would have been indicated by an output from the peak deviation unit 43 during the initial classification of the learning phase, and the output from the unit 43 would have closed the gate 44 and prevented any entry in the store 7 from being made. The channels 13 receive a pattern from the subtraction unit 12 which is integrated for two frames and the total after quantising and digitising in the units 15 is then stored in the second stores 16 together with a feature number from the feature number counter 19 and displacement information from the unit 46.

The displacement unit 46 coupled to the scanner 1 has two outputs, one of which is connected to one input of the comparison units 21 in the channels 13 for entry into the appropriate parts of the second stores 16. The signal on this output consists simply of two bits, one relating to the horizontal displacement of the scanner and the other to the vertical displacement of the scanner, as explained above with reference to FIG. 4. The displacement stored in the words of the second stores are compared with the displacement indicated by the unit 46 and any change required is indicated by the unit 21 which change indication is passed via the gate 22 to be inserted into the appropriate position in the store 16 during the application of a signal via the conductor 23. The second output of the displacement unit 46 consists of six bits, three allocated to the horizontal displacement and three to the vertical displacement of the scanner. These six bits are applied to the main store 24 and are used to amend the data stored therein in the same way as described above.

The displacement information is entered so that when displacement is effected in response to the stored data at some subsequent time, the scanner 1 tends to move towards the central position.

The effect of the displacment information in the second store 16 thus causes the scanner 1 to move in a succession of steps once every two frames so that the cell viewed by the scanner is moved towards the centre of the retina.

During the learning phase the random shift unit 48 causes a series of displacements of the scanner 1 from the centre of the field of view which displacements the displacement information in the second stores 16 tends to reduce to zero by a succession of steps each of one element. Therefore during the learning phase of the device, discounting for the present displacement controls provided by the main store 25, which occur once every 60 frames, the scanner 1 starts from the central position and suffers a series of random displacements in response to the unit 48 which rae cancelled by successions of smaller displacements provided by the displacement information in the second stores 16. During the classification phase, however, the displacement information in the second stores 16 tends to cause the scanner 1 to "home" on to what they have interpreted as a cell. Whilst in most cases it will, in fact, be a cell the main store 24 also includes some displacement information, so that if the main store 24 identifies the image scan by the scanner 1 as not belonging to a cell but merely consisting of parts of a number of cells, a displacement towards the centre of a cell can be instructed by the main store 24.

In order to conserve storage in the first and possibly the second stores the learning of features in these stores is restricted to those from patterns near the centre and should be inhibited whenever the displacement of a cell during the learning phase is greater than some suitable figure such as ±3 picture points; the gates 51 and 52 have been inserted to do this. The main store should be allowed to learn derived patterns from greater displacements from the centre in order to be able to home on to the centre of a cell if the second stores 16 do not do this.

The output patterns from the channels 13 are applied to the main store 24 from which the word providing the best fit to the incoming pattern is selected. During the learning phase a pattern from the channels 13 is entered into the store 24 after 60 frames of the scanner 1 unless the pattern selected therefrom includes the name entered on the key board 32. At the same time as the pattern is entered in the store 24 the displacement information from the unit 46 representing the displacement of the scanner 1 from the central position, together with the mask information and the name as set up on the keyboard 32 is also written into the store 24, the whole forming a new word.

For the early part of the learning phase of the machine it may be advisable to include limits for the displacements produced by the motor 45 so that the scanner 1 does not deviate greatly from the central position. In the later stages of the learning phase the servo-control from the second stores 16 will serve to prevent the scanner 1 from wandering too far from the centre of a cell displayed to the device.

FIG. 2*a* shows a cell 79 centralised in the retina of the scanner 1, at which position the device is initially taught to recognise a cell. In FIG. 2*b* the cell 79 is shown at the right-hand side of the retina and since during the learning phase the operator always places a cell to be learned at the centre of the field of view then the outputs of the displacement unit 46 will indicate that displacement of the scanner in the direction of the arrow B is necessary to centralise the scanner 1 and thereby bring the cell 79 into the centre of the retina. FIG. 2*c* shows a cell 79 in the upper left corner and the displacement unit 46 produces singals indicating that displacement of the scanner 1 in the direction C is necessary to centralise the cell 79 in the retina. It is clear therefore that whilst the displacement of the scanner 1 during the learning phase of the device is measured with reference to the centre of the field of view, during the classification phase, because the displacement information included in the second stores 16 is related to the observed pattern, the scanner 1 will tend to bring a cell into the centre of the retina whether this cell is in the centre of the field of view or not. Similarly the displacement information from the main store 24 will tend to cause a shift of the scanner to centralise a cell in the retina.

The mask information from the store 24 which consists of three bits in every word is applied to an integrator 50 which has the effect of slowing down the response of the mask 49 to the mask information signals from the store 24 so as to reduce the likelihood of hunting.

It will be appreciated that similar apparatus to that described above could be used to effect rotation of the scanner 1 or change of scale of the pattern, for example, by means of a zoom lens attached to the scanner 1. In the claims following the term displacement is intended to include rotation and changes of scale of the pattern.

Although the invention has been described with reference to a specific embodiment it is in no wise limited to this embodiment and many other arrangements using the invention will be evident to those skilled in the art; for example pattern recognition devices of greater or lesser sophitication designed for distinguishing between patterns of any type, whether the devices are adaptive machines or not, are capable of utilising the invention. Specific apparatus for achieving functions in the device described above have not been defined in detail since suitable apparatus or apparatus for achieving a suitable alternative function will be evident to those skilled in the art.

What I claim is:

1. A pattern recognition device comprising sensing means for producing an input signal related to a pattern to be recognised, storage means for data signals related to previously classified patterns, associated identity signals, and displacement signals associated with some at least of said data signals, means for comparing said input signal with said data signals to select a data signal therefrom according to a particular selection criterion, means effective when said storage means includes a displacement signal associated with said selected data signal for producing a corresponding displacement, or the effect of a corresponding displacement, of said pattern to be recognised relative to said sensing means so as to cause an input signal related to the displaced pattern to be applied to said sensing means for a further comparison with said data signals, and means for producing an output signal in response to the identity signal associated with the selected data signal which most nearly fulfils said criterior.

2. A device according to claim 1 wherein said storage means includes a plurality of storage means for data derived from corresponding portions of previously classified patterns, each storage means storing data derived from respective portions of a pattern, and associated with data from each portion displacement information and a respective identiy signal, said comparing means including means for comparing data in each said storage means with signals derived from the corresponding portion of said pattern to be recognized to select portions of previously classified patterns according to said selection criterion, the displacement information associated with the selected pattern portions being used for selectively producing displacement, or the effect of displacement, of said pattern to be recognized relative to said sensing means.

3. A device according to claim 2 wherein said displacement information associated with a pattern portion includes an indication of such component of displacement, if any, as may be required in each of two co-ordinate directions, and said displacement, or the effect of displacement, being produced by means for selectively effecting a displacement in said co-ordinate directions in response to the totals of the respective components associated with the selected portions.

4. A device according to claim 2 wherein the same identity signal is stored for data derived from portions of the same previously classified pattern in effectively different positions.

5. A device according to claim 1 including a further store for secondary patterns derived in response to identity signals from said storage means, there being associated with each secondary pattern in said further store further displacement signals and respective identity signals, means being provided for selecting that one of said secondary patterns which most closely resembles the pattern derived in response to identity signals from said storage means, the production of said displacement, or the effect of displacement, being also responsive to displacement information associated with said selected secondary pattern of said further store, and said output signal being produced in response to the identity signal associated with said selected secondary pattern.

6. A device according to claim 1 including means for inhibiting the entry of previously classified pattern data signals into said storage means if previously stored pattern data signals in said storage means bear a relatively close resemblance of said pattern data signals to be entered into said storage means.

7. A device according to claim 1 wherein said sensing means is responsive to a region at least as large as said pattern to be recognised and said displacement effected in response to the signals produced by said sensing means in such as to tend to centralise said pattern in said region.

8. A device according to claim 1 including means for masking the field of view of said sensing means in response to signals derived from said sensing means so as to be substantially the same size as said pattern to be recognised, whereby extraneous matter can be excluded from the field of view.

References Cited

UNITED STATES PATENTS

| | | | |
|---|---|---|---|
| 3,069,079 | 12/1962 | Steinbuch et al. | 235—61.11 |
| 3,231,860 | 12/1966 | Chatten | 340—146.3 |
| 3,315,229 | 4/1967 | Smithline | 340—146.3 |
| 3,396,377 | 8/1968 | Strout. | |
| 3,421,151 | 1/1969 | Wong. | |

THOMAS A. ROBINSON, Primary Examiner

R. F. GNUSE, Assistant Examiner

U.S. Cl. X.R.

235—61.11; 340—324